United States Patent [19]

Maeda

[11] Patent Number: 4,968,862
[45] Date of Patent: Nov. 6, 1990

[54] MULTIPLE CIRCUIT SWITCH DEVICE WITH DRAIN PASSAGE

[75] Inventor: Takuya Maeda, Furukawa, Japan
[73] Assignee: Alps Electric Co., Ltd., Tokyo, Japan
[21] Appl. No.: 339,752
[22] Filed: Apr. 18, 1989
[30] Foreign Application Priority Data Jun. 28, 1988 [JP] Japan .......................... 63-84469[U]

[51] Int. Cl.$^5$ ...................... H01H 9/02; H01H 25/04
[52] U.S. Cl. .................................. 200/5 R; 200/306
[58] Field of Search ............... 200/5 R, 5 A, 512-517, 200/306, 16 C, 16 D, 16 R, 6 A

[56] References Cited

U.S. PATENT DOCUMENTS

| 3,627,935 | 12/1971 | Spievak | 200/512 X |
| 4,428,649 | 1/1984 | Main | 350/289 |
| 4,560,845 | 12/1985 | Takamura et al. | 200/517 X |
| 4,611,102 | 9/1986 | Ishida | 200/5 R |

FOREIGN PATENT DOCUMENTS

| 0337045 | 4/1988 | European Pat. Off. | |
| 198816 | 7/1958 | Fed. Rep. of Germany | |
| 1222137 | 6/1960 | France | |
| 1138448 | 6/1957 | Netherlands | |
| 2259052 | 11/1978 | Netherlands | |
| 7920191 | 11/1979 | Netherlands | |
| 8015820 | 6/1980 | Netherlands | |
| 2120853 | 12/1983 | United Kingdom | 200/306 |

Primary Examiner—J. R. Scott
Attorney, Agent, or Firm—Guy W. Shoup; Paul J. Winters

[57] ABSTRACT

In a switch device including a case, a partition wall formed in the case, a plurality of switch elements provided under the partition wall, each the switch element having an actuator, and an operating knob rockably mounted over the partition wall for driving the actuator of the each switch element; the improvement comprising a plurality of cylindrical walls formed to upwardly project from the partition wall, each the cylindrical wall defining a through-hole therein, a driving rod vertically movably inserted into the each through-hole and having upper and lower ends abutting against the operating knob and the actuator of the switch element, and a drain passage formed in a side wall of the case for discharging a liquid having entered a space of the case over the partition wall to the outside of the case. That is, the through-hole is closely engaged with the driving rod. The cylindrical wall surrounding the through-hole projects over the partition wall. Accordingly, even when the liquid such as rainwater enters the case from a gap around the operating knob, it is prevented that the liquid will flow to the switch elements. Further, the liquid having entered the case may be positively discharged through the drain passage to the outside of the case.

1 Claim, 9 Drawing Sheets

MULTIPLE CIRCUIT SWITCH DEVICE WITH DRAIN PASSAGE

BACKGROUND OF THE INVENTION

The present invention relates to a switch device for selectively operating a plurality of switch elements provided in a case by depressing an operating knob rockably mounted on the case, and more particularly to a water proof structure of the switch device.

Such a switch device is used as a mirror switch for remote-controlling a mirror mounted on a body of an automobile, for example, from a driver's seat by a driving force of motors.

FIGS. 9 and 10 are a vertical sectional view and an exploded perspective view of a conventional switch device to be used as the mirror switch.

Referring to FIGS. 9 and 10, reference numerals 1 and 2 designate a case opened at its lower end and a cover for closing the open lower end of the case, respectively. The case 1 and the cover 2 are connected with each other in a snap fashion to form an outer shell of the switch device. A printed circuit board 3 is mounted on the cover 2, and four lever switches 4, a single slide switch 5 and connectors 15 are soldered to the printed circuit board 3. Each lever switch 4 is provided with an L-shaped actuator 4a projecting from an upper end thereof and with a lever 4b adapted to be rotated by depressing the actuator 4a to effect a switching operation. The slide switch 5 is provided with an operating lever 5a projecting from an upper end thereof and adapted to be slid to effect a switching operation.

The case 1 is formed on its upper surface with a recess 6 having a square shape in plan and a recess 7 having a track shape in plan, both recesses 6 and 7 being juxtaposed in plan. Four through-holes 8 are formed at four corners of the recess 6 in correspondence with the lever switches 4, and an upwardly projecting wall 10 having an opening 9 is formed at a central portion of the recess 6. The recess 7 is formed at its bottom with an elongated hole 11.

Reference numeral 12 designates an pusher knob having a square shape in plan. The pusher knob 12 is formed at its lower four corners with elongated vertical legs 12a projecting downwardly. Further, four short legs 12b are so formed as to project downwardly from the pusher knob 12 in such a manner that each leg 12b is located intermediate of the adjacent vertical legs 12a. The pusher knob 12 is further formed with pawls 12c depending therefrom. Four click rubber members 13 each having a conical shape shape are disposed between the bottom surface of the recess 6 and the four short legs 12b. Thus, the pusher knob 12 is received in the recess 6 in such a manner that the pawls 12c are engaged with a lower peripheral edge of the upwardly projecting wall 10. Accordingly, when the pusher knob 12 is depressed at its corner against an elastic force of the click rubber members 13, the elongated vertical leg 12a at the corner of the pusher knob 12 is lowered in the through-hole 8 to urge the actuator 4a of the corresponding lever switch 4 and thereby turn on the lever switch 4.

Reference numeral 14 designates a slider knob having an operating rod 14a depending therefrom. The operating rod 14a is inserted through the elongated hole 11, and is engaged with the operating lever 5a of the slide switch 5. Accordingly, when the slider knob 14 is moved along the recess 7, the operating lever 5a correspondingly reciprocated to conduct the switching operation of the slide switch 5.

The operation of the above prior art switch device is as follows:

When the slider knob 14 is reciprocated along the elongated hole 11, the slide switch 5 is operated to select a neutral position and a drive ready position for driving either of a right or left mirror. In the drive ready position, when the pusher knob 12 is depressed at its corner to be rocked in a given direction, the elongated vertical leg 12a at the depressed position of the pusher knob 12 is lowered to urge the actuator 4a of the corresponding lever switch 4 and thereby turn on the lever switch 4. In this operation, the click rubber members 13 are deformed by the depression of the pusher knob 12 to enable an operator to recognize the on-operation of the lever switch 4 with a click feeling. When the depression force applied to the pusher knob 12 is removed, the pusher knob 12 is returned to the position shown in FIG. 9 by the elastic force of the click rubber members 13. Thus, one of the four lever switches 4 is selectively turned on by selecting a position of depression of the pusher knob 12. As a result, a motor (not shown) is driven, and a driving force of the motor is transmitted through a power transmitting system (not shown) to the mirror selected by the slider knob 14, thereby driving (inclining) the mirror in a direction corresponding to the direction of depression of the pusher knob 12.

In the above-mentioned switch device, the elongated vertical legs 12a of the pusher knob 12 are vertically moved in the through-holes 8 of the recess 6 of the case 1 to selectively operate the switch element (the lever switch 4). As the pusher knob 12 is rocked, one of the elongated vertical legs 12a is moved horizontally as well as vertically. Accordingly, it is necessary to define a considerable clearance between each leg 12a and each through-hole 8, so as to permit such horizontal movement of the leg 12a. In the case that the switch device is exposed to a liquid such as rainwater and drinking water, there is a possibility that the liquid will enter the case 1 from a gap between the case 1 and the pusher knob 12 through the clearance of the through-holes 8, causing short-circuit of wiring patterns on the printed circuit board 3 and contacts of the switch elements 4 and 5. Although such short-circuit is hardly generated when the switch device is mounted on an instrument panel, the possibility of the short-circuit is remarkable when the switch device is mounted on the inside surface of a door of the automobile.

SUMMARY OF THE INVENTION

It is an object of the present invention to provide a switch device which improves the water proofness.

According to the present invention, there is provided in a switch device including a case, a partition wall formed in said case, a plurality of switch elements provided under said partition wall, each said switch element having an actuator, and an operating knob rockably mounted over said partition wall for driving said actuator of said each switch element; the improvement comprising a plurality of cylindrical walls formed to upwardly project from said partition wall, each said cylindrical wall defining a through-hole therein, a driving rod vertically movably inserted into said each through-hole and having upper and lower ends abutting against said operating knob and said actuator of said switch element, and a drain passage formed in a side wall of said case for discharging a liquid having entered a space of said case over said partition wall to the outside of said case.

When the operating knob is depressed to be rocked in an arbitrary direction, the driving rod located under the depressed position of the operating knob is lowered in the through-hole to drive the actuator of the corresponding switch element, thereby effecting switching operation. In this operation, a horizontal component of the rocking motion of the operating knob is absorbed by relative movement of the operating knob and the driving rod at the abutting portion thereof. Accordingly, it is unnecessary to define a considerable clearance between the driving rod and the through-hole. That is, the through-hole is closely engaged with the driving rod. The cylindrical wall surrounding the through-hole projects over the partition wall. Accordingly, even when the liquid such as rainwater enters the case from a gap around the operating knob, it is prevented that the liquid will flow to the switch elements. Further, the liquid having entered the case may be positively discharged through the drain passage to the outside of the case.

Other objects and features of the invention will be more fully understood from the following detailed description and appended claims when taken with the accompanying drawings.

DETAILED DESCRIPTION OF THE PREFERRED EMBODIMENT

Figure 1:
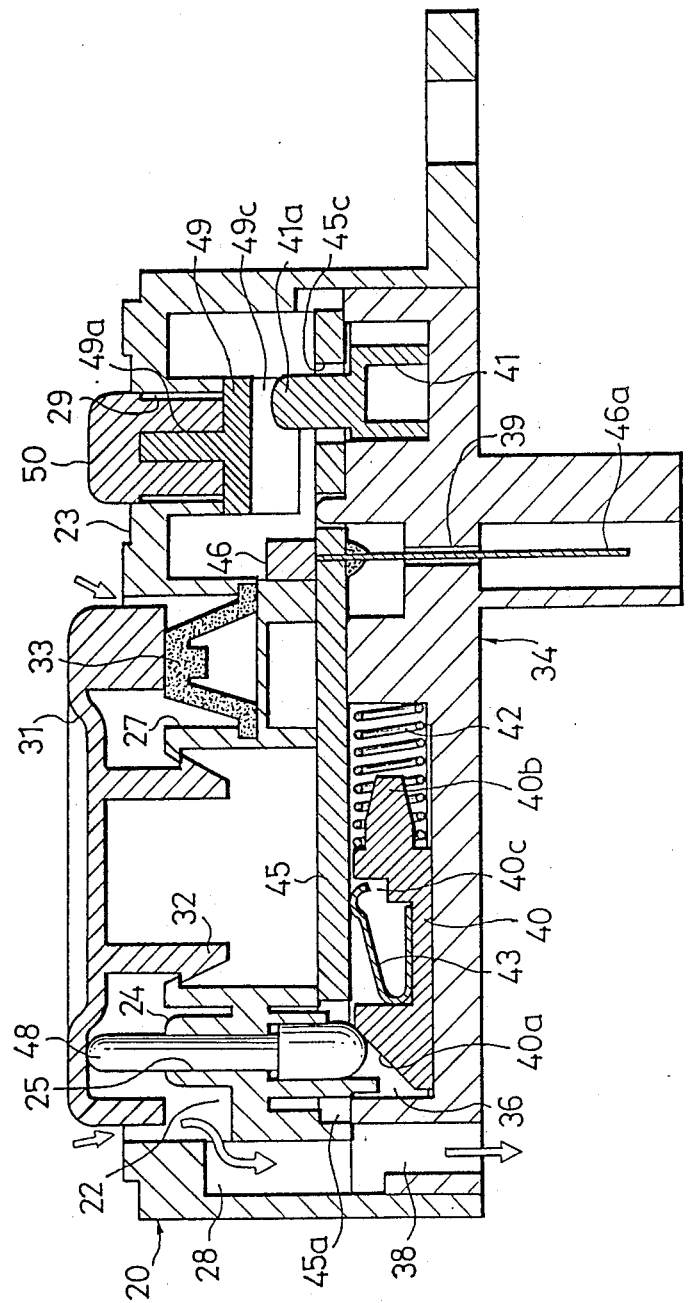
FIG. 1 is a vertical sectional view of the switch device according to a preferred embodiment of the present invention.

There will now be described a preferred embodiment of the present invention with reference to FIGS. 1 to 8.

Referring to the drawings, reference numeral 20 designates a case formed with a horizontal partition wall 21. As apparent from FIGS. 1 to 4, the case 20 is open at its lower end. Above the partition wall 21 are formed a relatively deep recess 22 having a substantially square shape in plan and a relatively shallow recess 23 having a substantially rectangular shape in plan, these recesses 22 and 23 being juxtaposed in plan. Four cylindrical vertical walls 24 are formed at four corners of the recess 22 in such a manner as to project upwardly and downwardly from the partition wall 21, thus forming four through-holes 25 in the cylindrical walls 24. At a central portion of the recess 22 is formed an upwardly projecting wall 27 having a substantially cross-shaped opening 26 which wall 27 has an uppe end slightly higher than the upper end of each cylindrical wall 24. The case 20 is formed at its one side with a pair of drain holes 28 communicated with the recess 22 and the lower opening of the case 20. The recess 23 is formed with an elongated hole 29, and a pair of parallel guide plates 30 project downwardly from the lower surface of the recess 23 on opposite sides of the elongated hole 29.

Reference numeral 31 designates a pusher knob having a substantially square shape in plan. The pusher knob 31 is formed at its central portion with four pawls 32 depending therefrom. Four click rubber members 33 are interposed between the pusher knob 31 and the case 20 in such a manner that each of the click rubber members 33 is disposed between the adjacent cylindrical walls 24. The pusher knob 31 is inserted into the recess 22, and the pawls 32 of the pusher knob 31 are engaged with the peripheral edge of the opening 26 of the wall 27. Thus, the pusher knob 31 is rockably retained in the recess 22.

Reference numeral 34 designates a cover for closing the lower opening of the case 20. The cover 34 is connected with the case 20 in a snap fashion to form an outer shell of the switch device. As apparent from FIGS. 1, 2, 5 and 6, the cover 34 is formed with an upwardly projecting guide wall 35 to define three first spaces 36 each having a rectangular shape in plan and a single second space 37 having a rectangular shape in plan. The cover 34 is formed at its one side with a pair of drain holes 38 to be communicated with the drain holes 28 of the case 20 (See FIG. 1). The cover 34 is further formed with a plurality of small holes 39 arranged in a line.

Figure 7:
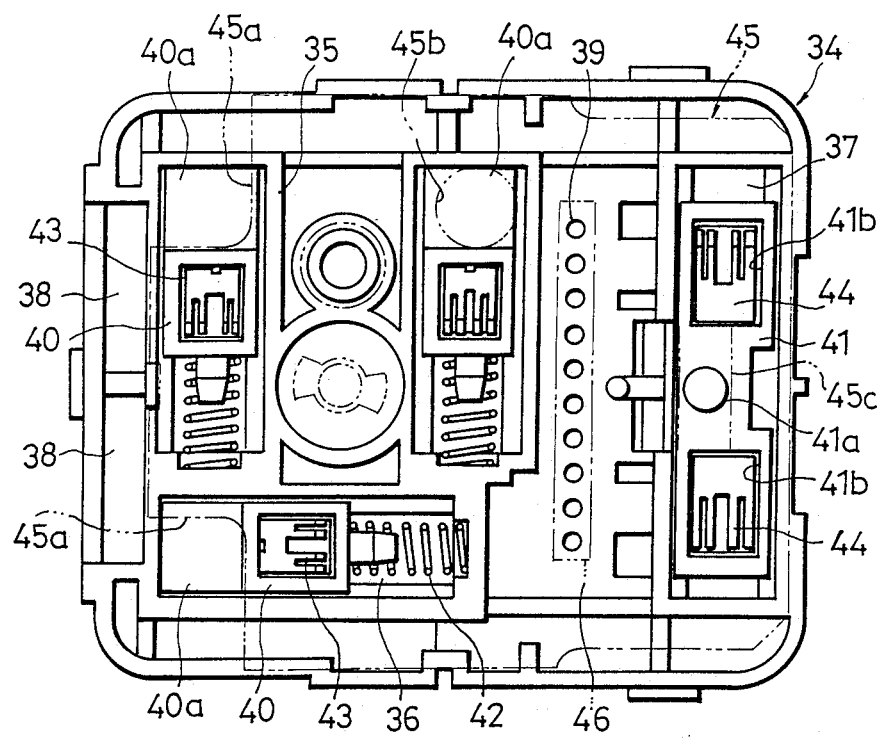
FIG. 7 is a plan view of the cover after the sliders are mounted therein.

As shown in FIG. 7, three first sliders 40 are reciprocatably received in the first spaces 36, respectively, and a single second slider 41 is also reciprocatably received in the second space 37. As shown in FIG. 1, each of the first sliders 40 is formed at its one end with a tapering surface 40a and at the other end with a spring receiving portion 40b. A spring 42 is interposed between the spring receiving portion 40b and the guide wall 35. Each first slider 40 is further formed with an upper opening recess 40c for receiving a first sliding element 43 as a movable contact of the switch device. On the other hand, the second slider 41 is formed at its upper surface with a driving projection 41a, and is further formed with a pair of upper opening recesses 41b on opposite sides of the driving projection 41a for receiving a pair of second sliding elements 44 as movable contacts of the switch device.

Figure 2:
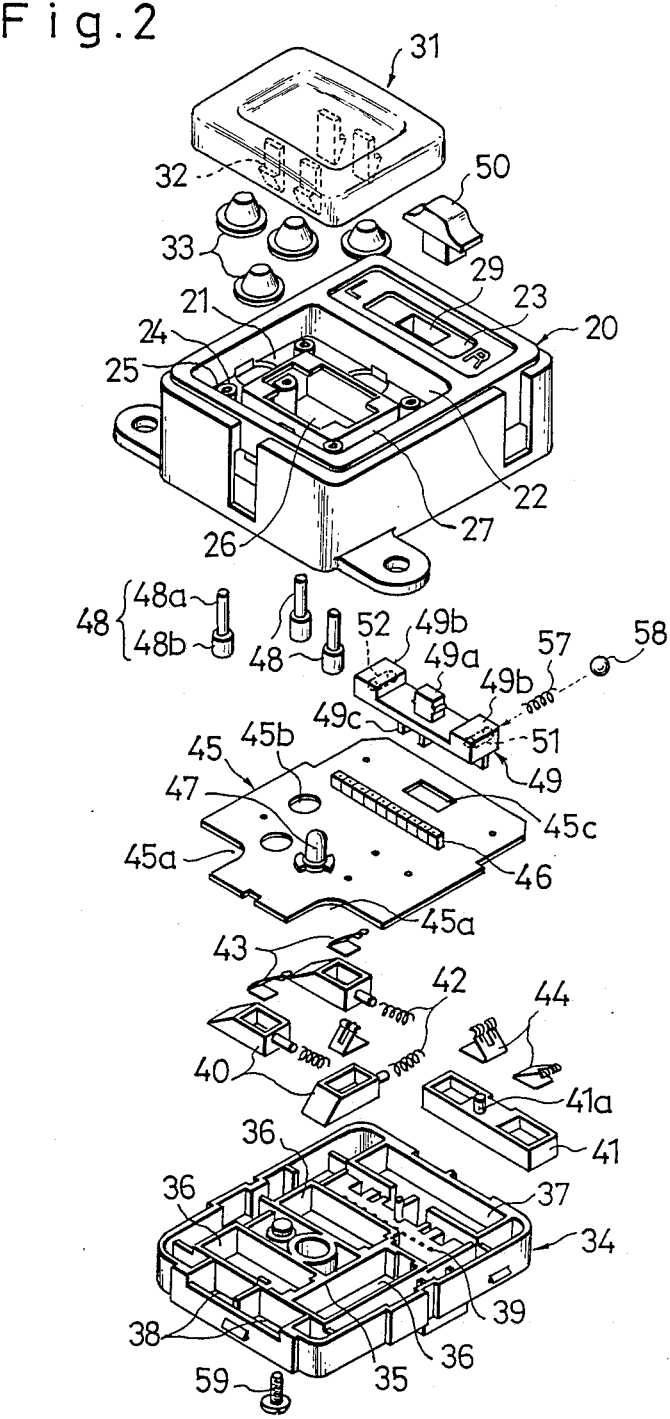
FIG. 2 is an exploded perspective view of the switch device shown in FIG. 1.

Reference numeral 45 designates a printed circuit board fixedly sandwiched between the case 20 and the cover 34. The first and second sliders 40 and 41 are prevented from getting out of the first and second recesses 36 and 37, respectively, by the printed circuit board 45. As shown in FIG. 2, the printed circuit board 45 is formed with a pair of cutouts 45a, a circular hole 45b and a rectangular hole 45c. The tapering surfaces 40a of the first sliders 40 are exposed to the cutouts 45a and the circular hole 45b, and the driving projection 41a of the second slider 41 is inserted through the rectangular hole 45c to project over the printed circuit board 45. A plurality of connectors 46 are soldered to an upper surface of the printed circuit board 45, and an illumination lamp 47 is mounted on the upper surface of the printed circuit board 45. Further, plural sets of fixed contacts (not shown) adapted to contact the sliding elements 43 and 44 are patterned on the lower surface of the printed circuit board 45. Such patterns for the lamp 47 and the fixed contacts are connected with the connectors 46. The connectors 46 are provided with a plurality of connector pins 46a to be inserted through the small holes 39 to reach the outside of the cover 34.

As shown in FIG. 2, reference numerals 48 designate three driving rods each having a small-diameter portion 48a and a large-diameter portion 48b. The small-diameter portion 48a and the large-diameter portion 48b have spherical upper and lower ends, respectively. The small-diameter portions 48a of the driving rods 48 are vertically movably inserted into three of the four through-holes 25. The spherical upper end of each small-diameter portion 48a abuts against the lower surface of the pusher knob 31, and the spherical lower end of each large-diameter portion 48b passes the cutouts 45a and the circular hole 45b of the printed circuit board 45 and abuts against the tapering surface 40a of each first slider 40 (see FIG. 1).

Figure 3:
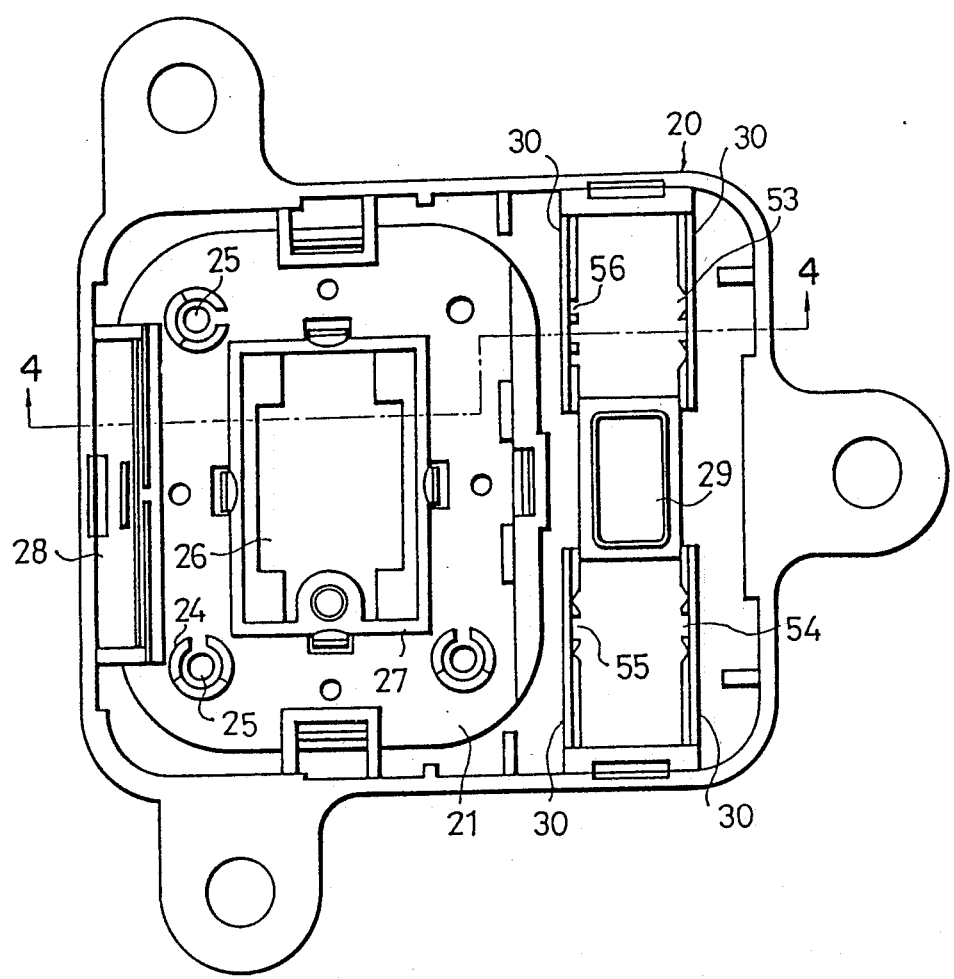
FIG. 3 is a bottom plan view of the case shown in FIG. 1.
Figure 4:
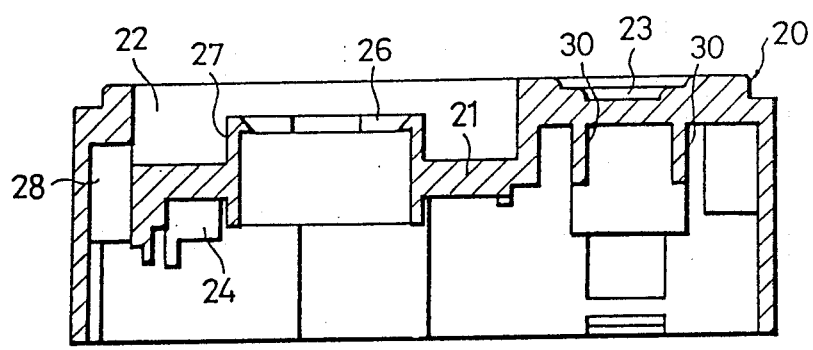
FIG. 4 is a cross section taken along the line A—A in FIG. 3.
Figure 6:
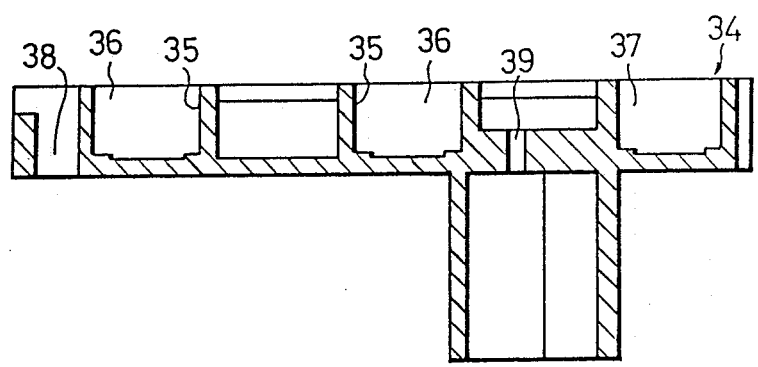
FIG. 6 is a cross section taken along the line B—B in FIG. 5.
Figure 5:
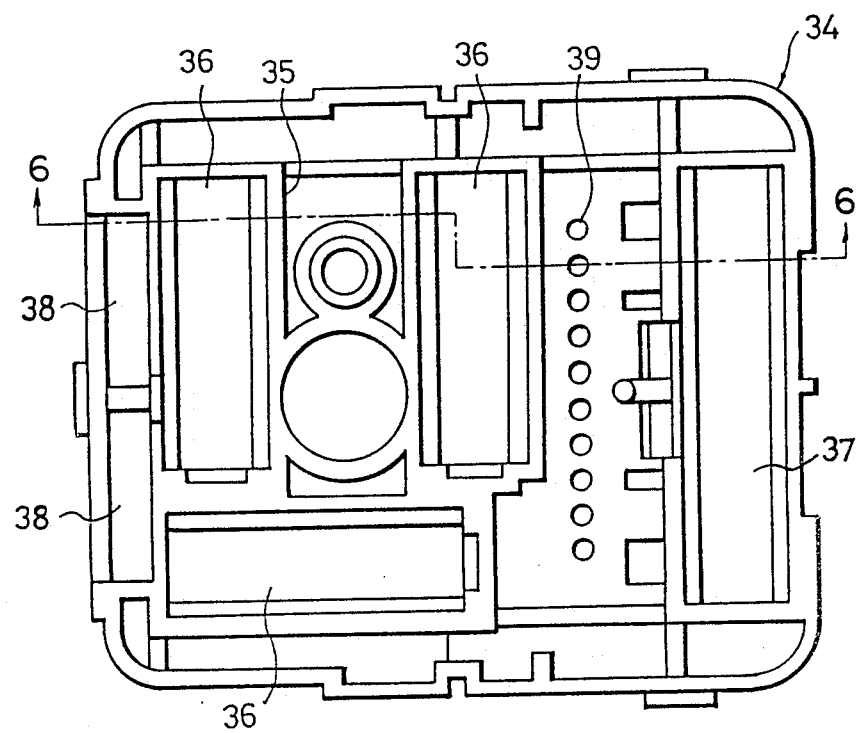
FIG. 5 is a plan view of the cover shown in FIG. 1.

As shown in FIG. 2, reference numeral 49 designates a driving member located between the guide plates 30. The driving member 49 is formed at its upper central portion with a connecting projection 49a to be connected in a snap fashion in the elongated hole 29 with a slider knob 50 located in the recess 23 of the case 20. Accordingly, when the slider knob 50 is reciprocated along the elonogated hole 29, the driving member 49 is also reciprocated in the same direction along the guide plates 30. The driving member 49 is formed at its longitudinal opposite end portions with a pair of thick-walled portions 49b having first and second blind holes 51 and 52 opened at one side. The driving member 49 is further formed at its lower central portion with a pair of opposed walls 49c projecting downwardly, between which the driving projection 41a of the second slider 41 is located. As shown in FIG. 3, the guide plates 30 are formed on their inside surfaces with first to fourth cams 53, 54, 55 and 56 having different cam shapes. The different cam shapes mean different shapes, depths and widths of grooves constituting the cams 53–56. A ball 58 is received together with a spring 57 into either of the first blind hole 51 or the second blind hole 52, and the ball 58 is engageable with one of the cams 53–56 (which will be hereinafter described in more detail). Reference numeral 59 designates a set screw for reliably fixing the case 20 to the cover 34. The set screw 59 is inserted from the cover 34 side through the printed circuit board 45, and is threadedly engaged with the case 20.

In operation, when the slider knob 50 is in a neutral position, the switch device is in an inoperative condition where motors for driving the mirrors are not driven irrespective of depression of the pusher knob 31. When the slider knob 50 is moved from the neutral position along the elongated hole 29 to reciprocate the driving member 49 along the guide plates 30, the driving projection 41a of the second slider 41 is driven by the opposed walls 49c of the driving member 49, and the second slider 41 is reciprocated in the second space 37. As a result, the second sliding elements 44 retained in the second slider 41 are slid on the fixed contacts (not shown) formed on the lower surface of the printed circuit board 45 to thereby select the contact of a selecting circuit. Thus, in accordance with a direction of movement of the slider knob 50, either of a right or left mirror is brought into a drive ready condition. In the above operation, the ball 58 received in either of the blind hole 51 or 52 of the driving member 49 is brought into engagement with and disengagement from one of the first to fourth cams 53–56 as receiving a resilient force of the spring 57. Accordingly, an operator can reliably recognize the neutral position and the selected position with a given click feeling.

As best seen in FIG. 1, under the drive ready condition, when the pusher knob 31 is depressed at its arbitrary position, the driving rod 48 located under the depressed position is lowered along the through-hole 25 to urge the tapering surface 40a of the first slider 40 contacting the lower end of the driving rod 48. As a result, the lowering movement of the driving rod 48 is converted into a horizontal movement by the tapering surface 40a, and the first slider 40 is horizontally longitudinally moved in the first recess 36 against a resilient force of the spring 42. As a result, the first sliding element 43 retained in the first slider 40 is slid on the fixed contact (not shown) formed on the lower surface of the printed circuit board 45 to thereby selectively turn on one of the three slide switches corresponding to the depressed position of the pusher knob 31. Then, in accordance with an on-signal from the switch, a motor (not shown) is driven in a normal or reverse direction, and a driving force of the motor is transmitted through a power transmitting system to the mirror previously selected, thus driving the mirror. In the above operation, the click rubber member 33 located under the depressed position of the pusher knob 31 is deformed to enable the operator to recognize the on-operation of the switch with a given click feeling. When the depression force applied to the pusher knob 31 is removed, the pusher knob 31 is returned to the neutral position as shown in FIG. 1 by the resilient force of the click rubber member 33, and the first slider 40 as well as the driving rod 48 abutting thereagainst is also returned to the neutral position as shown in FIG. 1 by the resilient force of the spring 42, thus selecting the switch from the on-condition to the off-condition.

In the case that the switch device as mentioned above is exposed to a liquid such as rainwater and drinking water, the liquid enters a gap defined between the peripheral edge of the recess 22 of the case 20 and the pusher knob 31 to the inside of the recess 22 as shown by arrows in FIG. 1. However, since the through-holes 25 formed through the partition wall 21 in the recess 22 are engaged with the driving rods 48 and are surrounded by the cylindrical walls 24, and the opening 26 in the recess 23 is surrounded by the upwardly projecting wall 27, there is almost no possibility that the liquid having entered the recess 22 will flow through the through-holes 25 and the opening 26 to the printed circuit board 45 or the first slider 40 under the printed circuit board 45. Furthermore, since the liquid is momentarily discharged through the drain holes 28 of the case 20 and the drain holes 38 of the cover 34 communicated with the drain holes 28 down to the outside of the cover 34, it is prevented that the liquid will stay long at the bottom of the recess 22, thereby further enhancing a water proof effect. As to the elongated hole 29 formed through the case 20, since the elongated hole 29 is always closed by the slider knob 50 irrespective of the selected position of the slider knob 50, there is almost no possibility that the liquid will enter the case 20 from the elongated hole 29.

Figure 8A:
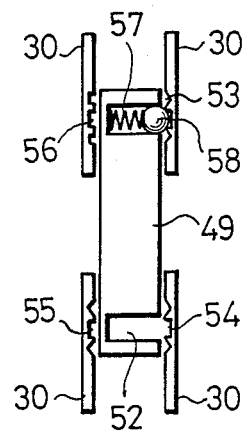
FIGS. 8(a) to 8(d) are illustrations of the click mechanism in various cases adapted to the preferred embodiment.

The click feeling in the sliding operation of the slider knob 50 may be modified as follows:

Referring to FIG. 8(a) which employs the first cam 53 so as to generate the click feeling, the spring 57 and the ball 58 are inserted into the first blind hole 51 of the driving member 49, and the driving member 49 is inserted between the opposed guide plates 30 in such a manner that the open ends of both the blind hole 51 and 52 are opposed to the guide plate 30 on the right-hand side as viewed in the drawing. Then, the driving member 49 is connected with the slider knob 50 inserted into the elongated hole 29. In this case, when the driving member 49 is reciprocated by the slider knob 50 along the guide plates 30, the ball 58 is brought into engagement with and disengagement from the first cam 53. Thus, the click feeling corresponding to the cam shape of the first cam 53 may be obtained.

Figure 8B:
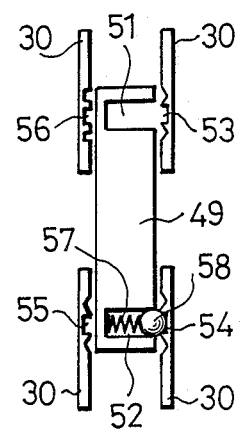

Referring to FIG. 8(b) which employs the second cam 54 so as to generate the click feeling, the spring 57 and the ball 58 are inserted into the second blind hole 52, and the driving member 49 is inserted between the opposed guide plates 30 in such a manner that the open ends of both the blind holes 51 and 52 are opposed to the guide plate 30 on the right-hand side as viewed in the drawing. In this case, the ball 58 is brought into engagement with and disengagement from the second cam 54 when the driving member 49 is reciprocated, and the click feeling corresponding to the cam shape of the second cam 54 may be obtained.

Figure 8C:
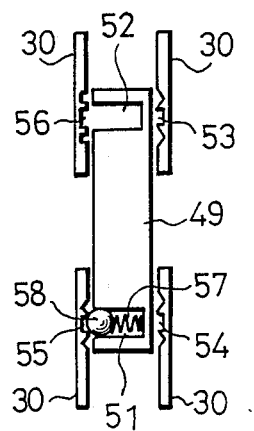

Referring to FIG. 8(c) which employs the third cam 55 so as to generate the click feeling, the spring 57 and the ball 58 are inserted into the first blind hole 51 of the driving member 49, and the driving member 49 is rotated 180 degrees from the position shown in FIGS. 8(a) and 8(b), and is inserted between the opposed guide plates 30 in such a manner that the open ends of the first and second blind holes 51 and 52 are opposed to the guide plate 30 on the left-hand side as viewed in the drawing. In this case, the ball 58 is brought into engagement with and disengagement from the third cam 55 when the driving member 49 is reciprocated, and the click feeling corresponding to the cam shape of the third cam 55 may be obtained.

Figure 8D:
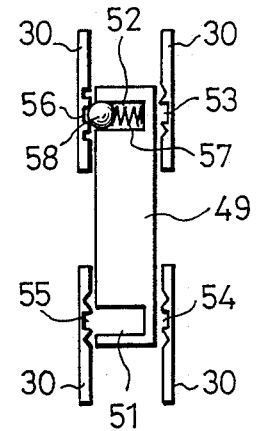
Figure 9:
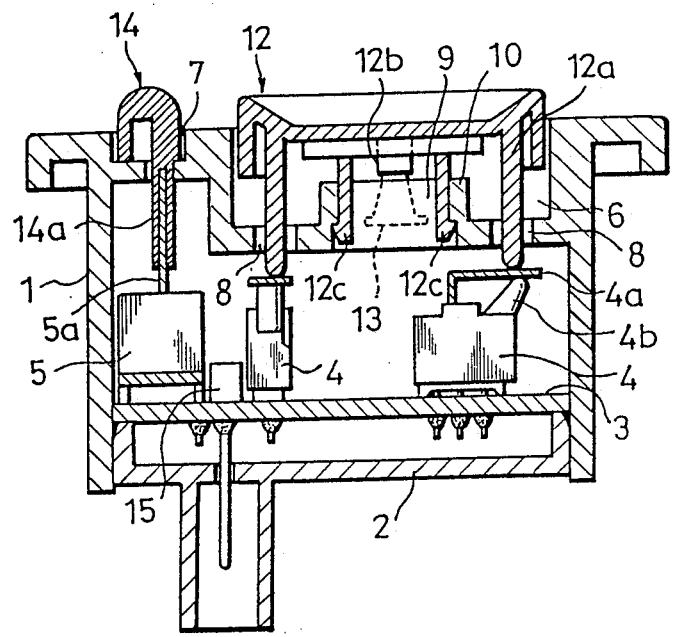
FIG. 9 is a vertical sectional view of the switch device in the prior art.
Figure 10:
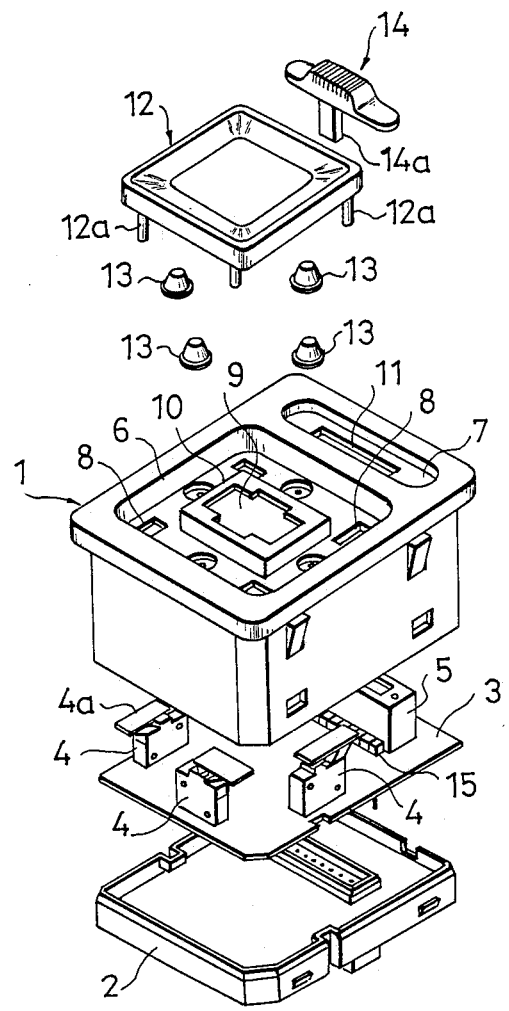
FIG. 10 is an exploded perspective view of the switch device shown in FIG. 9.

Referring to FIG. 8(d) which employs the fourth cam 56 so as to generate the click feeling, the spring 57 and the ball 58 are inserted into the second blind hole 52, and the driving member 49 is inserted between the opposed guide plates 30 in such a manner that the open ends of the first and second blind holes 51 and 52 are opposed to the guide plate 30 and the left-hand side as viewed in the drawing. In this case, the ball 58 is brought into engagement with and disengagement from the fourth cam 56 when the driving member 49 is reciprocated, and the click feeling corresponding to the cam shape of the fourth cam 56 may be obtained.

In this manner, four kinds of the click feeling may be obtained with use of common parts by selecting either of the first blind hole 51 or the second blind hole 52 for inserting the spring 57 and the ball 58 and by selecting the surface of the driving member 49 having the open ends of the first and second blind holes 51 and 52 to be opposed to one of the first to fourth cams 53-56.

Although the switch element to be driven by the driving rod is of a slide type such that the slider having the movable contact is slid on the fixed contact formed on the printed circuit board in the above preferred embodiment, any other types of the switch elements such as a lever switch and a push switch may be employed according to the present invention.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a switch device including a case having a cover portion and a base portion, a partition wall disposed within said cover portion parallel with said base portion, said partition wall having a plurality of through holes and a plurality of cylindrical walls, each one of said plurality of cylindrical walls surrounding one thorugh hole of said plurality of through holes, a plurality of pairs of fixed contacts adhered to a printed circuit board, said printed circuit board being disposed parallel with and between said partition wall and said base portion so that said plurality of pairs of fixed contacts face said base portion, a plurality of switch elements disposed between said base portion and said printed circuit board, each of said plurality of switch elements comprising an actuator and a conductive element, said conductive element being operatively associated with said actuator to move with said actuator when said actuator is moved and operatively placed between said actuator and said printed circuit board for contacting one pair of said plurality of pairs of fixed contacts to activate said switch device, an operator knob operatively mounted parallel with and on said cover portion of said case for rocking motion, and a driver rod inserted through each of said plurality of through holes to extend perpendicularly out of said each through hole on both sides of said partition wall, said driver rod having oppositely extending ends, a first end abutting one end of said actuator and a second end abutting said operator knob from a partition wall side of said knob, so that when said operator knob is pushed, it pushes on said driver rod, said driver rod being forced against said one end of said actuator, the improvement comprising:

said actuator having a tapered surface at said one end and a spring receiving end opposite to said one end, each of said plurality of switch elements further comprising a spring disposed on said spring receiving end of said actuator, said driver rod being forced against said tapered surface when said operator knob is pushed to slide said actuator against said spring so that said conductive element contacts with one of said pairs of fixed contacts to activate said switch device, said plurality of cylindrical walls extending perpendicularly from said both sides of said partition wall, a first extension of said plurality of cylindrical walls extending toward said operator knob and a second extension extending toward said base portion, a drainage passage extending through said cover portion and said base portion of said case, said drainage passage being separated from where said switch elements are located by at least said partition wall and said first extension of at least one of said plurality of cylindrical walls, so that liquid entering said switch near said operator knob will move through said case via said drain passage and out said base portion without entering where said switch elements are located.

* * * * *